US012710740B1

(12) United States Patent
Osterkamp et al.

(10) Patent No.: US 12,710,740 B1
(45) Date of Patent: Aug. 18, 2026

(54) THREE-DIMENSIONAL PRINTING NETWORK SYSTEM

(71) Applicant: United Services Automobile Association (USAA), San Antonio, TX (US)

(72) Inventors: Bryan J. Osterkamp, New Braunfels, TX (US); Pooja Krishnaswamy, McKinney, TX (US); Nolan Serrao, Plano, TX (US); Kristina Suniga-Cabrera, San Antonio, TX (US); Carol Lyn Lawrence, Fair Oaks Ranch, TX (US); Breanna Nicole Allerkamp, Boerne, TX (US); Courtney Evans, Duluth, GA (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 534 days.

(21) Appl. No.: 18/162,356

(22) Filed: Jan. 31, 2023

Related U.S. Application Data

(60) Provisional application No. 63/305,108, filed on Jan. 31, 2022, provisional application No. 63/305,110, filed on Jan. 31, 2022.

(51) Int. Cl.
*G05B 19/4099* (2006.01)

(52) U.S. Cl.
CPC .................... *G05B 19/4099* (2013.01); *G05B 2219/49023* (2013.01)

(58) Field of Classification Search
None
See application file for complete search history.

(56) References Cited

U.S. PATENT DOCUMENTS 9,229,674 B2 * 1/2016 Tapley .................... G06F 3/122
2015/0057784 A1 * 2/2015 Butler .................... G06F 3/1288 700/119
2017/0173889 A1 * 6/2017 Thomas-Lepore ... H04L 51/046
2017/0300855 A1 * 10/2017 Lund .......................... B64F 5/10
2018/0154579 A1 * 6/2018 Wang .................... B29C 64/386
2018/0267518 A1 * 9/2018 Hassman ......... G05B 19/41845
2019/0072932 A1 * 3/2019 Sitnikov ............... B29C 64/147
2019/0180291 A1 * 6/2019 Schmeling ............. G16H 20/10
2022/0197246 A1 * 6/2022 Cella ........................ B22F 10/85
2022/0388246 A1 * 12/2022 Decrop ................. B29C 64/386
2023/0074164 A1 * 3/2023 Ghosh ...................... A61C 8/00

FOREIGN PATENT DOCUMENTS

JP 2017177624 A * 10/2017

* cited by examiner

*Primary Examiner* — Jason Lin
(74) *Attorney, Agent, or Firm* — Fletcher Yoder, P.C.

(57) ABSTRACT

A parts system includes a network of printers and a controller. The network includes a personal 3D printer, a first-party 3D printer, and/or a third-party 3D printer. Generally, the network of 3D printers prints a replacement part for a consumer. The controller receives a request to print the part and provides a recommendation to print the part based at least in part on historical data of the part. The controller also provides a recommendation to select a 3D printer of the network of 3D printers based at least in part on a stock of a material for printing the part. Furthermore, the controller determines printing the part via the selected 3D printer.

13 Claims, 6 Drawing Sheets

THREE-DIMENSIONAL PRINTING NETWORK SYSTEM

BACKGROUND

The present disclosure relates generally to providing three-dimensional (3D) printed materials to consumers. More specifically, the present disclosure relates to efficiently generating and providing parts to consumers by using 3D printing.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, a consumer may insure a property, a device, and the like, through one or more insurance companies (e.g., a warranty company). For example, the consumer may insure a house, a car, a cellular device, appliances, and so forth. The consumer may request a new part or a replacement part from an insurance company by submitting a request for the part.

After receiving the request, the insurance company may ship the part to the consumer if it is in stock with the insurance company. However, the shipping may take substantial time or experience delays, especially if the consumer is located in a remote area. In some instances, the insurance company may submit an additional request to a manufacturer that manufactures the part. Often, the manufacturer may not have the part in stock and thus, may take time to produce the requested part (e.g., a few weeks or months). The process of the manufacturer sending the part to the insurance company and the insurance company sending the part to the consumer may take additional time. It is now recognized that the process for ultimately providing the requested part to the consumer may be time consuming and inefficient.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a parts system includes a network of printers and a controller. The network includes a personal printer, a first-party printer, and/or a third-party printer. Generally, the network of printers prints a part for a consumer. The controller receives a request to print the part and provides a recommendation to print the part based at least in part on historical data of the part. The controller also provides a recommendation to select a printer as a selected printer of the network of printers based at least in part on a stock of a material for printing the part. Furthermore, the controller determines printing the part via the selected printer.

In one embodiment, a parts system includes a network connecting 3D printers and a controller. The network includes connections with a personal 3D printer, a first-party 3D printer, a third-party 3D printer, or any combination of a personal 3D printer, a first-party 3D printer, and a third-party 3D printer. The 3D printers in the network are each configured to print a part for a consumer. The controller is configured to receive a request to print the part, provide a recommendation to print the part based at least in part on historical data of the part, provide a recommendation to select a 3D printer from the 3D printers in the network, as a selected 3D printer of the network based at least in part on a stock of a material for printing the part, and initiate or confirm printing the part via the selected 3D printer of the network.

In another embodiment, a parts system includes one or more processors and a memory storing instructions that, when executed by the one or more processors, cause the one or more processors to receive data indicative of characteristics of one or more parts, determine a need for a replacement part based on comparing the data to a template, monitor one or more personal 3D printers in a network of 3D printers, select one of the personal 3D printers in the network of 3D printers as a selected personal 3D printer based on characteristics of the replacement part and characteristics of the selected personal 3D printer, and instruct the selected personal 3D printer in the network of 3D printers to print the replacement part.

In another embodiment, a method includes requesting authorization to monitor a personal 3D printer, receiving authorization to monitor the personal 3D printer, monitoring the personal 3D printer, wherein monitoring comprises determining a stock of one or more materials used to print one or more parts at the personal 3D printer; and predicting materials needed for printing in response to determining whether the stock of the one or more materials is below one or more thresholds.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
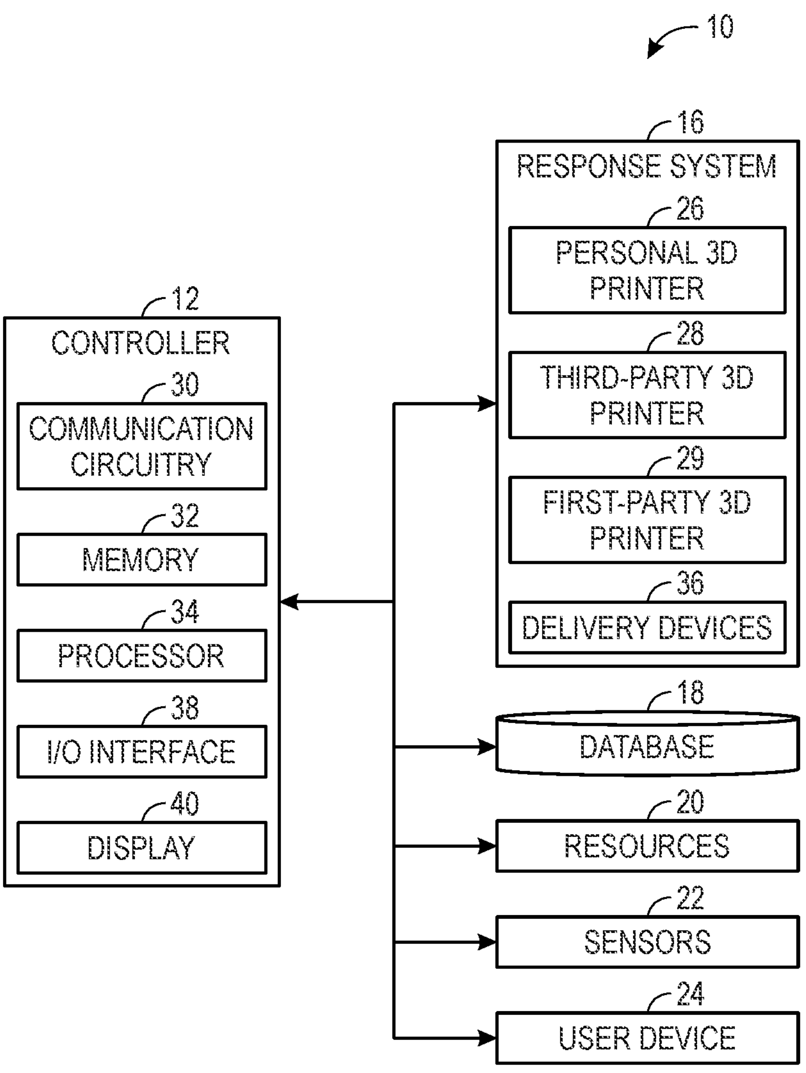
FIG. 1 is a block diagram of a parts system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As previously mentioned, a consumer (e.g., a user or a member) may insure property associated with the consumer, such as appliances (e.g., washing machine, dryer, water heater), a home, an electronic device, a vehicle, jewelry, and the like. The varying insured properties may be insured through respective insurance companies for the respective properties. Often, a property may be completely or partially replaced. That is, the property or portions of the property may include parts that may no longer be in condition to serve an intended purpose and thus, may be replaced. In some instances, the parts may be replaced due to updates to the property (e.g., a new version).

By way of example, a vehicle (e.g., the property) associated with the consumer may include a headlight (e.g., a part of the property) that flickers or does not power on, and thus, does not operate as intended or expected. The consumer may submit to the insurance company insuring the vehicle a request for provision of a replacement part for the headlight. However, the process for the insurance company to provide the replacement part to the consumer may be inefficient and time consuming. That is, the insurance company may spend time checking stock, mailing the replacement part, waiting for the replacement from the manufacturer, and so forth.

To efficiently provide the replacement part to the consumer, the insurance company may utilize a parts system for three-dimensional (3D) printing to provide the replacement part. In particular, the parts system may use a network of 3D printers (e.g., a network of mechanisms configured to deposit material in layers to create structures via additive manufacturing), for example, to avoid delays otherwise associated with 3D printing using a limited number of 3D printers available for fulfilling each print request. The network may include personal 3D printers, first-party 3D printers associated with the insurance company, and/or third-party 3D printers not directly associated with the insurance company. Using a personal 3D printer may facilitate efficiently printing the replacement part rather than relying on one or more intermediaries to deliver the replacement part for subsequent installation. Additionally or alternatively, the insurance company may use first-party 3D printers that are associated with the insurance company to print the parts. First-party 3D printers may include 3D printers owned, operated, or directly accessible by the insurance company, like 3D printers at facilities owned by the insurance company, employees of the company, and/or insured members of the insurance company. By way example, the insurance company may include multiple 3D printing facilities, such that at least one 3D printing facility is within a threshold distance from any consumer. In this manner, the insurance company may print the part on a first-party 3D printer and efficiently deliver the printed part to any of numerous consumers within a network.

Moreover, employees, members, or both, of the insurance company may authorize the insurance company to use their personal 3D printers to complete printing requests from other members. Additionally or alternatively to the personal 3D printers or the first-party 3D printers, the insurance company may use third-party 3D printers. The third-party 3D printers may include 3D printers operated by direct repair providers, professional mechanics, manufacturers for the parts, and the like. That is, the insurance company may form an agreement with third parties to complete 3D printing requests. For example, the insurance company may license a particular number of third-party 3D printers. In some embodiments, the number of licensed third-party 3D printers may be based on availability of personal 3D printers, first-party 3D printers, or both, within a threshold distance from each insured member.

A parts system may monitor printing provided by the 3D printers. For a personal 3D printer, the parts system may request authorization by the member. Monitoring may involve tracking the number and types of parts printed, materials used for 3D printing the respective parts, and the like. In this manner, the parts system may automatically determine if the supply of printing material is low (e.g., below a predetermined threshold) at a location having 3D printers. When the supply is low, the parts system may locate the material or compatible substitute material at a nearby location, provide the location to the member for pickup, and/or place a request to deliver the material (e.g., via air shipping, ground shipping, drone delivery, and the like) to the location of the 3D printers. In some embodiments, the parts system may request delivery of a 3D printer to the location having 3D printers or to a location associated with the member, such as a house or office.

In some embodiments, the parts system may monitor one or more factors associated with the insured property, such as environmental conditions near or at a particular location or area (e.g., within a threshold distance from the insured property) that may impact the insured property and materials suitable for printing parts. In some embodiments, a user device application, such as an application executed on a mobile device, a tablet device, a wearable device, and so forth, associated with the user (e.g., owned or used by the user), may facilitate in monitoring the one or more factors. The user device application may predict replacement parts to print based on the monitored one or more factors being outside a predetermined threshold (e.g., humidity above a predetermined humidity threshold for the area including the insured property). Moreover, the user device application may recommend or predict the materials to use for printing the replacement parts, location where the materials may be retrieved, and so forth, based on the environmental conditions.

Furthermore, the user device application may also scan or otherwise capture data of a part to be replaced, for example, without removing or uninstalling the part. By way of example, a part or a portion of the insured property that includes the part for an insured car may be scanned by the user device and the parts system may provide a recommendation for the replacement part, the materials compatible for the part (e.g., preferred materials or substitute materials), stock of the materials or the part, and so forth. In this manner, the best option of the replacement part may be efficiently printed and installed in the car.

The parts system may use historical data and/or machine learning to provide recommendations of parts to print based on a request indicating the insured property. In particular, the parts system may receive questions or input related to an insured property and provide respective answers. In particular, the parts system may reference a database of the parts. Generally, the parts system may connect members via the personal 3D printers, the first-party 3D printers, and/or the third-party 3D printers to efficiently provide printing services.

It should be noted that although examples provided herein may be specifically directed to replacement parts for certain types of insured property, the techniques in this disclosure may be applied to other conditions and/or contexts, such as any context for providing objects (e.g., medical field, real estate field, and so forth). Thus, the present examples should be understood to reflect real-world examples of the replacement parts for insured property to provide useful context for the discussion, and should not be viewed as limiting further applicability of the present approach. For example, the present disclosure should be understood as being applicable to additional situations in which 3D printing may be utilized, such as for creating housing, prototypes, toys, medical tools and devices, prosthetics, and so forth.

With the preceding in mind, FIG. 1 is a block diagram of a parts system 10. As shown, the parts system 10 includes a controller 12, which may communicate with (e.g., transmit data to and/or receive data from) a response system 16, one or more databases 18, one or more resources 20, one or more sensors 22, and/or one or more user devices 24 associated with the consumer (e.g., user). It should be understood that the illustrated parts system 10 is merely intended to be exemplary, and that certain features and components may be omitted and various other features and components may be added to facilitate performance, in accordance with the disclosed embodiments.

The controller 12 may include a communication circuitry 30, a memory 32, a processor 34, an input/output interface 38 (I/O interface), and a display 40. The controller 12 may enable the communication circuitry 30 to interface with various electronic devices, the response system 16 (e.g., including respective one or more processors 34, memories 32, and/or other system devices), the databases 18, the resources 20, the sensors 22, and the user device 24 associated with the consumer (collectively referred to as "components").

The communication circuitry 30 may allow the controller 12 to communicatively couple to a network, such as a personal area network (PAN), a local area network (LAN), and/or a wide area network (WAN). Accordingly, in some embodiments, the controller 12 may process data from the components to make parts-related determinations, such as to determine present stock of a requested part based on information in the databases 18, monitor materials used for 3D printing via personal, first-party, or third-party 3D printers, determine recommendations to provide for a printing location, predict recommendations to make in view of monitored factors (including without limitation environmental conditions), and so forth. Similarly, the controller 12 may communicate data to the components via the communication circuitry 30, such as to communicate a status of the requested part to the user device 24. For example, after processing sensor data from the sensors 22 that has been received at the input/output interface 38 via the communication circuitry 30, in which the sensor data indicates that a part is damaged, the processor 34 may determine and transmit a wireless control signal to the response system 16 via the communication circuitry 30 to instruct the 3D printing of the part at a particular 3D printer. By way of example, the processor 34 may also determine and transmit a wireless message to a delivery service to deliver printing materials to the particular 3D printer. In some embodiments, the communication circuitry 30 may be connected via a wireless connection to the components. In additional or alternative embodiments, the communication circuitry 30 may be connected via a wired connection to the components.

The processor 34 may include one or more processing devices that receive input signals from the I/O interface 38, such as signals indicating a request received from the consumer for the part (e.g., a request received from the user device 24). This information may be processed to subsequently send signals, such as signals indicating a recommendation to the requesting consumer of the materials to use for printing, a comparison between the cost to print or request delivery of the part in stock, and so forth.

The memory 32 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired algorithms (e.g., program code) in the form of machine-executable instructions or data structures and which can be accessed by the processor 34 or by other processor-based devices. In particular, the processor 34 may include a processing core to execute machine-executable instruction algorithms stored in the memory 32. The processor 34 may also include processor-side interfaces for software applications running on the processing core to interact with hardware components, software components, or both, of the parts system 10. The memory 32 may store algorithms for processing data indicating inventory at multiple storage locations, monitoring materials used for 3D printing, determining available printers for printing requests within the network of printers, and so forth. By way of example, and as will be discussed with respect to FIG. 6, the memory 32 may include algorithms or store programs (e.g., a recommendation system) to provide a recommendation of a type of part and/or the material of the part based on a model of a part for an insured property or the part to be replaced. That is, the recommendation system of the parts system 10 may refer to historical data or use machine learning to recommend a type of part and material for the part based on received data indicating the particular part to be replaced and/or a portion of the insured property to include the part. For purposes of this application, the term model refers to 3D printing instructions, which may include for example a design file containing one or more designs of the part of an insured property, a listing of materials that may be used to 3D print the part of an insured property, an order of operation (e.g., sequenced printing layers), or a combination thereof.

Additionally, the memory 32 may also store algorithms indicating the threshold for delivering materials for 3D printing (e.g., recommended materials are within a threshold distance from a consumer) and the like. In some embodiments, the stock stored in the memory 32 may be periodically updated based on the databases 18, which may be updated in real time or approximately real time. By way of example in the replacement part setting, the stored algorithms may include, but are not limited to, algorithms used to determine stock of parts around the area or location, a request for part types based on data from the sensors 22, the user device 24, or both, algorithms determining one or more materials to be used for the 3D printing based on received data, algorithms to route a printing request to a 3D printer within the network of printers, algorithms determining that the materials to print the part are not within a threshold distance, algorithms determining to deliver the materials to the selected 3D printer or to print remotely, and so forth.

In general, the I/O interface 38 may be interfaces that facilitate communication with the components (e.g., the response system 16, the database 18, the resources 20, the sensors 22, and the user device 24) and other devices. In some embodiments, the I/O interfaces 38 may couple to other peripheral components such as input devices (e.g., keyboard, mouse), sensors, input/output modules (I/O), and the like. The display 40 may operate to depict visualizations associated with software or executable code being processed by the processor 34. In one embodiment, the display 40 may be a touch display capable of receiving inputs from a user of the controller 12, such as an input to request the part. The display 40 may be any suitable type of display, such as a liquid crystal display (LCD), plasma display, or an organic light emitting diode (OLED) display, for example. Additionally, in one embodiment, the display 40 may be provided in conjunction with a touch-sensitive mechanism (e.g., a touch screen) that may function as part of a control interface for the controller 12.

The response system 16 may include one or more devices, one or more processors 34, and one or more memories 32 that fulfill a request for the requested part. By way of example, the response system 16 may fulfill a request from the controller 12, provide feedback associated with the fulfillment, send control signals or requests to a 3D printer to fulfill the request, and the like. The response system 16 may include one or more personal 3D printers 26 that are associated with the consumer requesting the part, one or more third-party 3D printers 28 that are not directly associated with the insurance company, one or more first-party 3D printers 29 that are directly associated with the insurance company, and one or more delivery devices 36. The delivery devices 36 may include one or more drones or unmanned aerial vehicles, vehicles, trains, airplanes, mobile printers (e.g., printers inside a moving device or vehicle) and the like, for delivering the part, printing the part, or both.

In some embodiments, the delivery devices 36 may include the 3D printers to print the replacement part without the consumer removing the part to be replaced from the insured property. That is, rather than the consumer removing the part to initiate a request for a replacement part, the delivery device 36 may include devices (e.g., cameras) that may capture images, video, and the like. As such, the delivery devices 36 may print the part at the insured property without the consumer removing the part to be replaced for analysis. Moreover, the response system 16 may be distributed across various geographical areas. For example, the distribution of printers and delivery devices 36 may be based on proximity to the present and potential consumers, the printing materials, direct repair providers, and so forth.

As previously mentioned, the consumer may print the part at a personal 3D printer 26. However, materials for printing the part may be unavailable, for example, within an intended delivery frame for the part, or the consumer may choose not to use the personal 3D printer 26. In such instances, the parts system 10 may request the remotely printing via the first-party 3D printer 29 or the third-party 3D printer 28. Moreover, the parts system 10 may monitor the 3D printing upon authorization by the consumer. That is, the parts system 10 may monitor the requests for printing, frequency of printing, parts being printed, the materials used for printing (e.g., recommended material versus an unsuitable material), and so forth. The parts system 10 may also monitor the first-party 3D printers 29 and the third-party 3D printers 28 (e.g., without requesting authorization). In this manner, the parts system 10 may determine present stock of materials at a printer, automatically request delivery of the materials to the printer upon a determination of low stock (e.g., from a facility operated by the insurance company and via a delivery device 36, from a member within a threshold distance from the consumer, from a facility operated by a third-party, and so forth).

As previously discussed, the first-party 3D printers 29 may be directly associated with the insurance company, such that the first-party 3D printers 29 include printers owned by or directly accessible by the insurance company. For example, the first-party 3D printers 29 may include printers at facilities operated by the insurance company, printers owned or associated with employees of the company, and/or printers owned or associated with members (or customers) of the insurance company. By way example, the insurance company may include multiple facilities, such that at least one printing facility is within a threshold from any consumer. In this manner, the insurance company may print the part and efficiently provide the printed part to the requesting consumer. Moreover, employees, members, or both, of the insurance company may authorize the insurance company to use their personal 3D printers 26 to complete printing requests from other members for member-to-member printing.

The third-party 3D printers 28 may include 3D printers associated with direct repair providers (DRPs), professional mechanics, original equipment manufacturers (OEMs), and the like. That is, the insurance company may form an agreement with third-party 3D printer providers to complete the printing requests. For example, the insurance company may license a particular number of third-party 3D printers 28 for a particular area. In some embodiments, the number of licensed third-party 3D printers 28 may be based on availability of personal 3D printers 26, first-party 3D printers 29, or both, for printing within a threshold distance from each insured consumer.

The response system 16 may utilize the delivery devices 36 to deliver the printed part, such as a part printed by the first-party 3D printer 29 or the third-party 3D printer 28, to fulfill the request for parts. The response system 16 may also store data (e.g., in the database 18 and/or in a table format in the databases 18) identifying the personal 3D printers 26, the third-party 3D printers 28, the first-party 3D printers 29, and the delivery devices 36. That is, the response system 16 may store unique identifier (IDs) for the 3D printers, the vehicles, or both, used for the printing (e.g., printer ID, model number of printer, and so forth). When used in this application, the term model number refers to an alphanumeric or other string of characters that identifies a particular object or class of objects. In this manner, the parts system 10 may monitor 3D printing across the network of 3D printers and the delivery devices 36. The parts system 10 may also identify and resolve for any 3D printers functioning in an unexpected manner by automatically requesting and reassigning the printing job to another 3D printer (e.g., another monitored printer within a threshold distance, assigned to a printer that will complete the printing within a threshold time frame, and so forth). The parts system 10 may also track status of the part (e.g., part ID, model number, associated printing request, and so forth) being printed using the unique ID of the 3D printer, the delivery device 36, or both.

The databases 18 may include one or more storage devices for storing data related to parts, such as inventory of 3D printers, inventory of each part (e.g., 3D printed and/or non-3D printed), inventory of printing material at each 3D printer and/or in each printing area, inventory of available replacement parts, identification of models (e.g., 3D printing instructions) and so forth. The inventory of the 3D printers may include the personal 3D printers 26, the first-party 3D printers 29, and/or the third-party 3D printers 28 to facilitate printing via any of these 3D printers. The inventory of the 3D printers may also include stock of parts with respect to these 3D printers. For example, the inventory of the 3D printers of the third-party 3D printers may include present stock of parts, extra parts, understocked parts, and so forth. By using the third-party 3D printers 28, such as 3D printers of direct repair providers, the insurance company may be involved in quality assurance from the third-party 3D printers 28 to insure the particular part. In some instances, using the third-party 3D printers 28 may be more cost effective for the insurance company by avoiding an investment in 3D printers (e.g., purchasing the printers), maintaining 3D printers, tracking the 3D printers, and so forth. In this manner, the insurance company may spend time insuring and replacing parts rather than printing the parts. Moreover, the insurance company may pass down the financial savings to employees, consumers, or both.

In some embodiments, the third-party of the third-party 3D printers 28 may insure the 3D parts for the insurance company. That is, the insurance company may send a printing request to the third-party 3D printers 28 upon an insurance claim so that the part may be efficiently produced and provided to the consumer (e.g., the part may be printed ahead of time if the part is unavailable in inventory), as well as assure quality of the part. In some embodiments, one or more third-parties of the third-party 3D printers 28 may determine inventory of parts within the network of the third-parties. The one or more third-parties may also determine availability to print 3D printing of the parts (e.g., recommended or suitable substitute materials is in stock to print the parts, type of 3D printers to provide the particular type of printing, general business availability to complete printing requests, and so forth). In some instances, inventories for the parts for each of the third-parties may be integrated into a block chain system.

As will be discussed herein, the parts system 10 may predict and automatically submit a request to print one or more parts via the personal 3D printers 26, the third-party 3D printer 28, and/or the first-party 3D printer 29, for an insured property based on received data (e.g., from the sensors 22) when the insured property may use a replacement part or a new part. By way of example, the parts system 10 may predict and automatically submit the request at time of impact to an insured vehicle based on data (e.g., location, speed, idling time, unexpected acceleration or braking, fuel consumption, unexpected performance or operations by vehicle, other telematics, and the like) from the sensors 22. The databases 18 may update in real time and may also include historical data related to environmental conditions for the printing areas. The databases 18 may also include historical data related to the parts for recommending printing of a particular part, as will be discussed with respect to FIG. 6.

The parts system 10 may determine a need for a replacement part by comparing received data (e.g., from the sensors 22) indicative of observable and measurable characteristics of a part to information in a template that contains one or more standards, series, or assembly of operable ranges or thresholds. For example, the parts system 10 may receive data (e.g., from the sensors 22) indicative of characteristics of the part, for example, the appearance of the part (e.g., color or shape), the conductivity of the part, and the like. This processor 34 may compare this received data to information in the template stored in the databases 18 regarding these characteristics, e.g., the image of the part, when compared to the image in the template, may reveal that the part includes a crack, and thus may be replaced. As another example, the color of the part, when compared to the color in the template, may indicate the material of the part has been fatigued and may have increased brittleness, and thus may be replaced. As another example, the conductivity of the part, when compared to the information in the template, may indicate that the material has been fatigued and is no longer an effective conductor, and thus may be replaced.

Data related to consumers, associated insured properties, insurance data for the consumer, and the like, may also be stored in the databases 18. The processor 34 may process a predictive algorithm and use this information when requesting parts for 3D printing. That is, the processor 34 may use the information to determine a present need or a future need of parts to be 3D printed and the materials for the parts. The processor 34 may automatically submit a request for printing the part in response to an indication of an unexpected condition at an insured property of the consumer (e.g., water flow within a pipe of the in insured home is not within an acceptable threshold for the pipe type). That is, the processor 34 may preemptively submit a request for a part based on the historical data and/or data from the sensors 22. In some embodiments, the processor 34 may also automatically submit a request for printing materials based on a stock of the materials below a stock threshold (e.g., less than 20 units, 30 units, and so forth) for the printer to print the part and/or for the particular area. The threshold may be based on a number of requests historically received for the part using the materials within a particular time frame (e.g., a day, a week, a month, and so forth). The threshold may also be based on a demand for parts using the materials in the particular area. Additionally, the printing materials may be based on suitable material types for parts in the particular area.

The resources 20 may include one or more data sources external to the controller 12 and the 3D printers. For example, the resources 20 may include electronic news sources, social media sources, any applications associated with the user device 24 (e.g., installed or used by the user device 24) such as global positioning system (GPS), and the like. The news sources may include various news services that may be updated in real time or near real time via a network, and they may provide information regarding weather alerts, natural disaster alerts, unnatural disaster alerts (e.g., traffic incidents, gas leak), and any other information that may be published via an electronic news outlet such as a webpage, news database, or the like. By way of example, the resources 20 may indicate that a natural disaster is approaching and the parts system 10 may automatically submit a request for printing materials for parts that will likely be printed in response to the natural disaster.

The social media sources may include social media sites such as Facebook®, Twitter®, and the like. In some embodiments, the social media may be associated with the consumer and/or the user device 24. For example, data from social media associated with the location of a user or a destination of the user may be provided to the controller 12. The social media may also include data trending on social media sites that may not be directly associated with the individual, but that may provide information regarding environmental conditions, such as the natural disaster, the dangerous situation, and the like. The processor 34 may determine (e.g., predictively determine) that materials for a replacement part or a new part may likely be requested based on the data from the resources 20, and thus, may automatically submit a request for delivery of the printing materials if the stock is below the stock threshold. In some embodiments, the controller 12 may include machine learning that may learn, via various data sets, the likelihood of a part to be requested and thus, may automatically submit the request for the printing materials. In some embodiments, 3D printing material may be supplied to areas experiencing environmental conditions below an acceptable threshold, such as areas experiencing natural disasters that may damage insured property. For example, the processor 34 may monitor data from the resources 20 to proactively start delivering the printing materials for areas experiencing environmental conditions below the acceptable threshold (e.g., request printing of materials used for shingles for roofs in response to receiving data indicating a tornado) for the area with the insured property.

The sensors 22 may include devices capable of detecting location, moisture, temperature, light, physical damage, telematics, counting, tracking, and the like. In some embodiments, the sensors 22 may include image capturing devices that are capable of viewing or capturing images or video. One or more sensors 22 may be disposed on or near the insured property (e.g., within a threshold distance from the property and/or the area), such that the sensors 22 may provide accurate information related to the condition of the property. The sensors 22 communicating with a printer may also count the number of parts printed, materials used, or both. By way of example, in an insured home, the sensors 22 may be disposed within a personal 3D printer 26 to track the parts printed and the materials used. The sensors 22 may also be included in devices associated with the consumer, such as the user device 24 that is carried by or worn by an individual. For example the sensors 22 may be disposed on mobile phones, wearable electronics, and the like. In one embodiment, the sensors 22 may provide location information of the sensors 22, capture images of parts to be replaced, and so forth.

Figure 2:
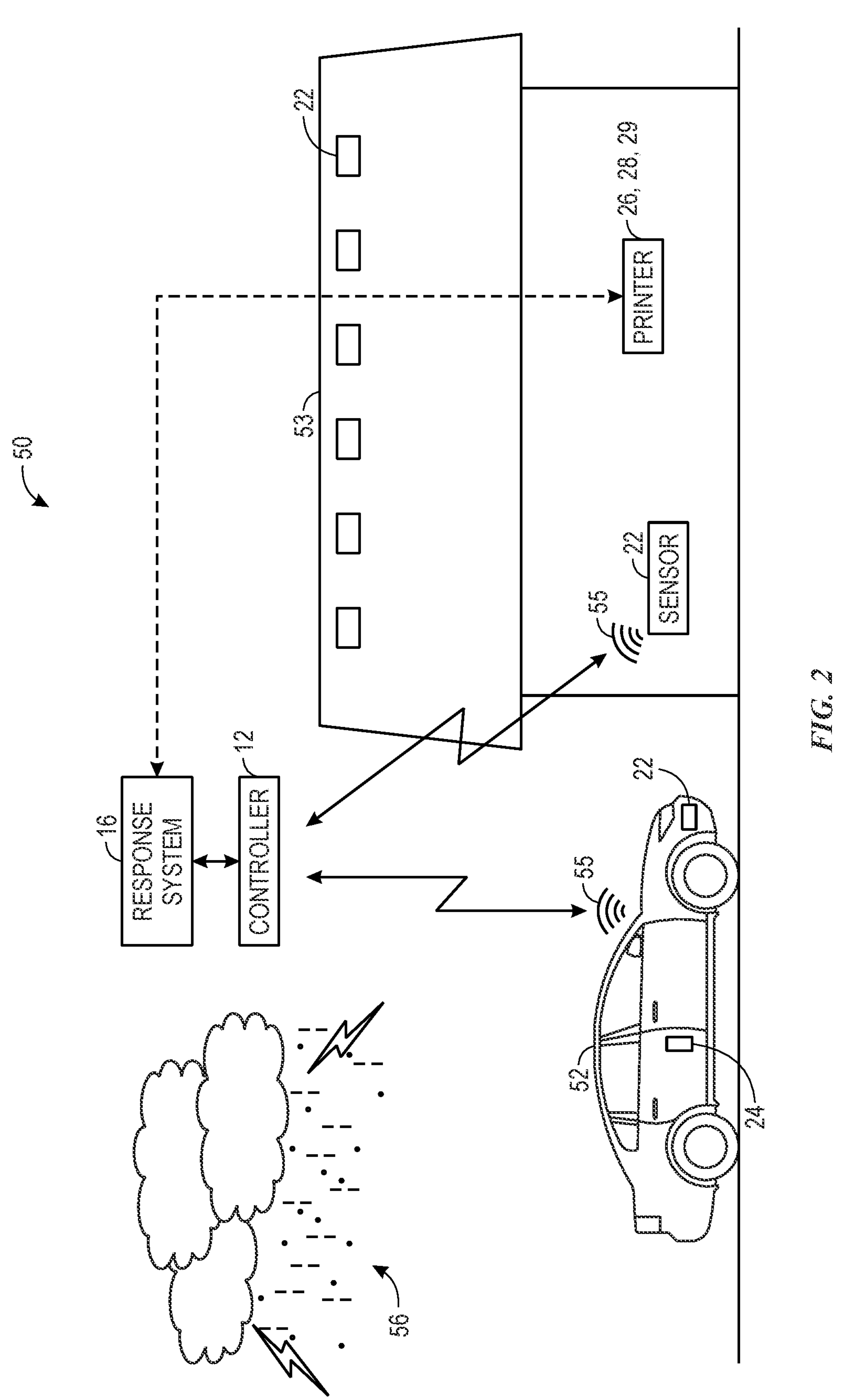
FIG. 2 illustrates an example of the parts system of FIG. 1 receiving data that initiates a request for printed parts, in accordance with embodiments described herein.

FIG. 2 illustrates an example 50 of the 3D parts system 10 monitoring the response system 16. As previously discussed, the processor 34 of the controller 12 may automatically submit a request for materials (e.g., based on certain conditions, predictions, and sensor data) or after receiving a request from the consumer. In the depicted example, the processor 34 may receive data related to one or more properties associated with the consumer, such as a vehicle 52, a house 53, or both (e.g., owned by and/or insured by the consumer). Here, the properties include sensors 22 that are located on the properties, such as on or near a headlight of the vehicle 52 (e.g., a car), integrated within the user device 24, coupled to a printer (e.g., directly or communicatively), and on the roof of the house 53. In some embodiments, the sensors 22 may be within a threshold distance from the properties, in which the threshold is based on a distance that may continue providing accurate data to the processor 34.

In this example, weather conditions 56 indicate weather conditions above or below an acceptable weather conditions threshold for parts of the vehicle 52, the house 53, or both. That is, based on the weather conditions 56, a consumer may print or request printing of a part using a personal 3D printer 26, a third-party 3D printer 28, or a first-party 3D printer 29. The parts may be printed using certain materials, such as, based on a particular area, present and/or historical environmental conditions for the area, stored information indicating part types for the replacement part, and so forth. In some embodiments, the parts system 10 may recommend materials based on data received from the sensors 22, as well dynamically change the recommendation based on changes in the data.

By way of example, the weather conditions 56 may indicate a storm, hailing, excessive heat, excessive cold, or local lightning, which may likely (e.g., above a likelihood threshold) cause damage to the parts. Weather may be ranked (e.g., in a database or lookup table) according to a threat level for each of various printable parts. Thus, when a particular weather type is detected, an assessment can be made with respect to likely need for a part in view of other relevant data (e.g., number of previously printed and unused parts, such as shingles). In some embodiments, the sensors 22 may include sensors that detect mobility, for example, to detect movement when the parts should be stationary. Here, some sensors 22 are placed on roof shingles of the house 53. The shingles should remain stationary on the roof. However, the sensors 22 may detect movement, and thus, may indicate unexpected conditions for the parts. In some embodiments, the sensors 22 may detect moisture above or over the threshold, such as for the shingles or a pipe inside the house 53. The consumer may request one or more parts based on the unexpected conditions for replacement shingles (e.g., parts), unexpected moisture outside the threshold, and the like. Data from the sensors 22 may also indicate a change in temperature, pressure, humidity, and the like, that may affirm or indicate that the weather conditions 56 are below or above the threshold, and the data may be used to recommend a particular material for printing the parts. In particular, the controller 12 (e.g., the processor 34 of the controller 12) may receive the data from the sensors 22 via the communication circuitry 30 that is communicated over a network 55. In some embodiments, the sensors 22 may include one or more sensors of one or more types based on the property monitored using the sensors 22.

The part may be printed using the personal 3D printer 26, the third-party 3D printer 28, or the first-party 3D printer 29. Based on historical data related to the part to be printed, data from the sensors 22, and/or the data from the user device 24, the parts system 10 may recommend using particular materials to print the part. Moreover, as previously discussed, the printing may be monitored using sensors 22 of the printer. The parts system 10 may also automate delivery of printing materials based on the monitoring, as will be discussed herein.

As previously mentioned, the user device 24 (e.g., mobile device) may include sensors 22 to scan or otherwise capture image data of a part to be replaced, for example, without removing or uninstalling the part. By way of example, a part or a portion of the insured property that includes the part for an insured car may be scanned by the user device and the parts system may provide a recommendation for the replacement part, the materials compatible for the part (e.g., preferred materials or substitute materials), stock of the materials for the part, and so forth. As will be discussed with respect to FIG. 6, the recommendation may be based on historical data, machine learning, or both. In some instances, the user device 24 may scan an ID or serial number on the part, indicating a part type and model number. The ID may be used for reference to facilitate requesting the replacement part (e.g., manually by an input of the ID or automatically upon the user device 24 scanning the ID in the phone application). Furthermore, as previously mentioned, the parts system 10 may predict and automatically submit the request as soon as the part no longer provides the intended function within a predetermined threshold. For example, the parts system 10 may determine via the sensors 22 of the vehicle 52 that the vehicle 52 experienced an unexpected impact. The parts system 10 may automatically request the particular part type, model (e.g., 3D printing instructions), and material for the particular vehicle based on data.

Figure 3:
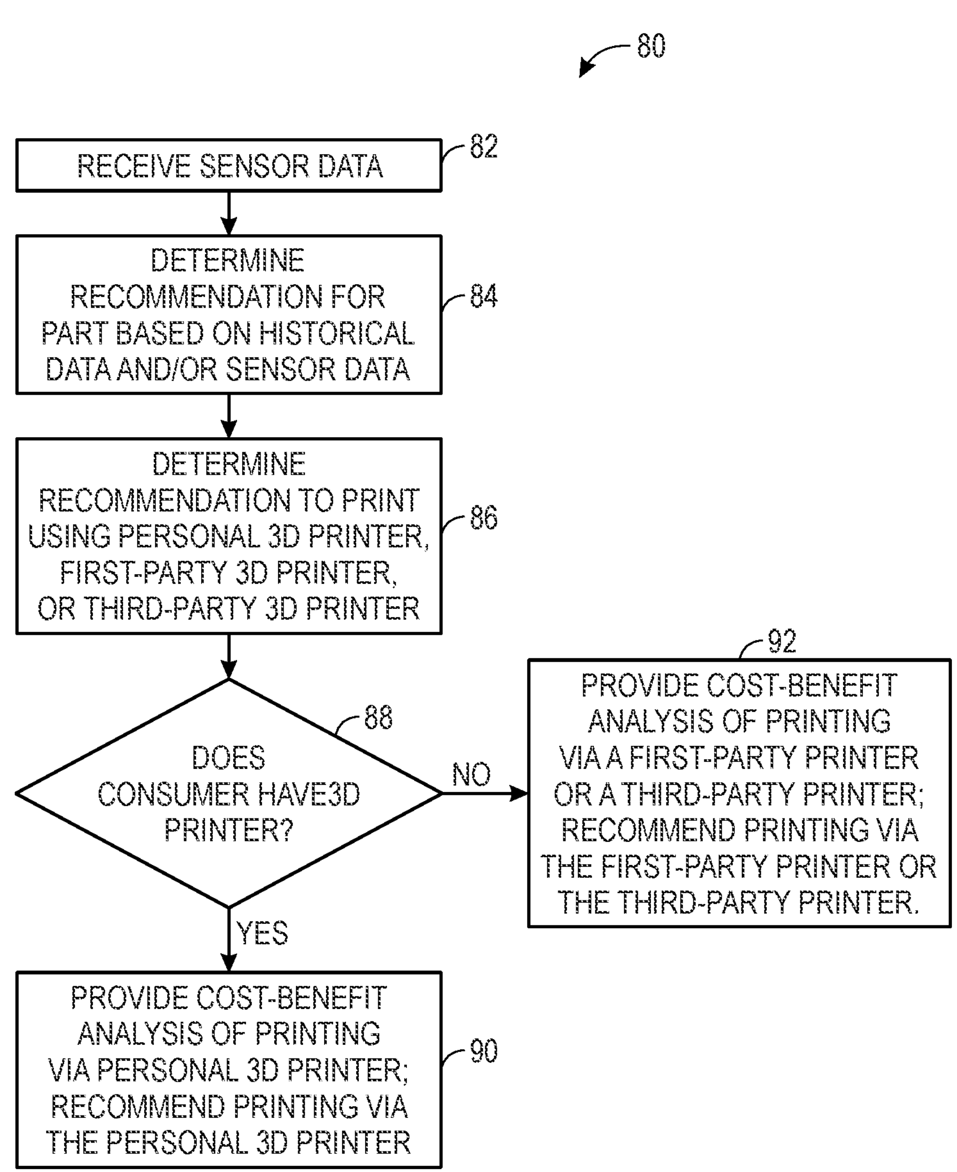
FIG. 3 is a flow diagram of a method for recommending a part to 3D print using the parts system, in accordance with embodiments described herein.

FIG. 3 is a flow diagram of a method 80 for recommending a part to 3D print using the parts system 10 of FIG. 1. While the method 80 of FIG. 3, the method 100 of FIG. 4, the method 120 of FIG. 5, and the method 150 of FIG. 6 are described using acts in a specific sequence, it should be understood that the described acts may be performed in different sequences than the sequence illustrated, and certain described acts may be skipped or not performed altogether. In general, at least some of the steps of the method 80, the method 100, the method 120, and the method 150 may be implemented at least in part by the parts system 10 of FIG. 1. Specifically, these steps may be implemented at least in part by the controller 12 and/or the processor 34 of the controller 12 that executes instructions stored in a tangible, non-transitory, computer-readable medium, such as the memory 32. In alternative or additional embodiments, at least some steps of the method 80, the method 100, the method 120, and method 150 may be implemented by any other suitable components or control logic, and the like.

The processor 34 may receive (process block 82) sensor data from the resources 20, the sensors 22, and/or relevant portable devices, such as user devices 24. As described herein, the sensor data may be used to predict materials for parts that can be preemptively addressed by 3D printing. The sensor data of the sensors 22 may also indicate conditions for recommending particular model numbers of the parts and/or materials to be used for printing the replacement parts. The processor 34 may monitor one or more insured properties located in one or more areas. By way of example, the processor 34 may monitor properties located within a particular area, which includes a space occupied within a threshold distance from a particular location (e.g., range of geographic coordinates). The insured properties may correspond to a demand for parts, as well as particular materials for the parts for the particular area in response to conditions in the area.

Additionally or alternatively, sensor data from the user device 24 may indicate the part type, model (e.g., 3D printing instructions for 3D printing the replacement part, which may include an indication of material to be used for printing the replacement part), common name of the part, and so forth. As previously discussed, the user device 24 may capture data of a part within a portion of the insured property without removing or uninstalling the part. The processor 34 may determine (process block 84) a recommendation for a part to print based on the sensor data, historical data, or both. In particular, the processor 34 may determine that one or more part types of the insured property may be replaced (which may include comparing received data to information stored in a template, as described above), a replacement part of the one or more part types, a model (e.g., 3D printing instructions for 3D printing the replacement part), and/or determine one or more materials that may be used for printing the part types for the particular property based on the sensor data (e.g., data indicating environmental conditions). The processor 34 may additionally or alternatively determine the recommendation based on the historical data, which includes data indicative of the particular part types compatible to provide the intended use for the insured property, material suitable to provide the intended function, and the like.

The processor 34 may determine (process block 86) a recommendation to print the recommended part using a personal 3D printer 26, a first-party 3D printer 29, and/or a third-party 3D printer 28. In particular, the processor 34 may refer to the network of printers in the area that may facilitate delivering the part within a particular time frame and/or within a cost frame. In some embodiments, the processor 34 may recommend a printer based on printing availability, stock of materials for the part, and similar factors. Printing via the personal 3D printer 26 may provide the fastest option for printing with respect to the first-party 3D printer 29 and third-party 3D printer 28 (e.g., no delivery time). As such, the processor 34 may determine whether (decision block 88) the consumer has a personal 3D printer 26. If the consumer does have a personal 3D printer 26, the processor 34 may provide (process block 90) a cost-benefit analysis of the benefit of printing the part via the personal 3D printer 26 compared to the first-party 3D printer 29, the third-party 3D printer 28, or both. Additionally, the processor 34 may provide a cost-benefit analysis of a part presently in stock (e.g., 3D printed or non-3D printed) in comparison to a customized part provided using 3D printing. As such, the processor 34 may indicate whether purchasing the 3D printed part is more cost efficient than purchasing the part in stock. In some embodiments, the part in stock may be a part that may provide the intended function for the insured property but that may not be the best option, for example, based on the model number or material of the part in stock.

On the other hand, if the consumer does not have a personal 3D printer 26, the processor 34 may provide (process block 92) a cost-benefit analysis of the benefit of printing the part via a first-party 3D printer 29 compared to a third-party 3D printer 28. That is, the processor 34 may recommend printing via the first-party 3D printer 29 or the third-party 3D printer 28 based on a delivery date associated with printing via the first-party 3D printer 29 and the third-party 3D printer 28, materials available for the first-party 3D printer 29 and the third-party 3D printer 28, delivery times to deliver the materials for printing, and the like. If, instead of the consumer having a personal 3D printer, the consumer does not have a personal 3D printer, the processor 34 may provide a cost-benefit analysis of a part presently in stock (e.g., 3D printed or non-3D printed) in comparison to a customized part provided using 3D printing. As such, the processor 34 may indicate whether purchasing the 3D printed part (to be printed on a first-party 3D printer 29 or a third-party 3D printer 28) is more cost efficient than purchasing the part in stock. In some embodiments, the part in stock may be a part that may provide the intended function for the insured property but that may not be the best option, for example, based on the model number or material of the part in stock. Timeliness of delivery may also be analyzed for optimization purposes. By employing these techniques, present embodiments create efficiencies in processing and printing operations by limiting processing time, printing time, and material usage.

Figure 4:
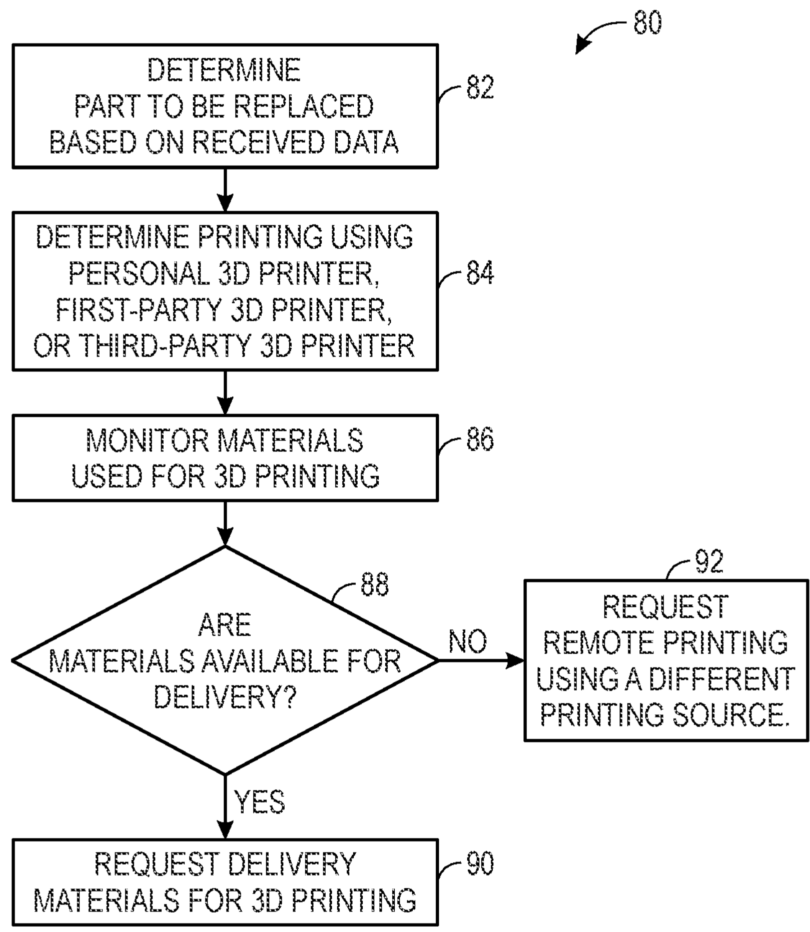
FIG. 4 is a flow diagram of a method for monitoring and delivering printing materials, in accordance with embodiments described herein.

FIG. 4 is a flow diagram of a method 100 for monitoring and delivering printing materials to a printer in a network of printers using the parts system 10 of FIG. 1. The processor 34 may determine (process block 102) a part to be replaced based on received data. That is, the processor 34 may determine that a part is to be replaced based on a request from the consumer (e.g., manual request for a particular part (based on a model number) or confirmation of a recommendation). The processor 34 may determine (process block 104) printing using the personal 3D printer 26, the first-party 3D printer 29, or the third-party 3D printer 28. That is, the processor 34 may recommend a particular printer and provide a cost-benefit analysis, as discussed with respect to FIG. 3. Based on the recommendation, the consumer may select the printer. For example, the consumer may select the first-party 3D printer 29 based on the printer method providing the quickest delivery for printing and/or using particular materials. As another example, the consumer may choose to print using the personal 3D printer 26 to receive incentives form the insurance company.

The processor 34 may monitor (process block 106) the materials for the 3D printing. The materials may include various materials that may facilitate the part providing the intended function in the area. That is, the processor 34 may request one or more of a range of materials based on the location of the property using the part. The materials may include, but are not limited to, metal, plastic, clay, concrete, wood (e.g., a wood and glue slurry), and so forth. By way of example, a recommended material may be metal if the part is to be delivered to a location that often experiences natural disasters that include fires while the recommended material may be plastic if the part is to be delivered to another location that does not experience fires.

In some embodiments, the processor 34 may monitor the materials used for printing when the consumer prints the part using the printer. When using the personal 3D printer 26, the processor 34 may monitor the materials used for printing to adjust insurance premiums for consumers using the network of printers. For example, the processor 34 may maintain or reduce premiums when the consumer uses a recommended or suitable material for printing and the processor 34 may increase premiums when the consumer does not use suitable material for printing the part or prints under unsuitable conditions (e.g., when overly humid). The consumer may use material that does not withstand environmental conditions in the area, and as such, the part may not provide the intended function for the insured property. Similarly, the first-party 3D printers 29 and the third-party 3D printers 28 may be monitored. By monitoring the printing, the processor 34 may accurately determine stock of materials (e.g., within or above a predetermined stock threshold) for printing parts. Moreover, the processor 34 may determine and provide a location that has materials in stock when the materials stock is below the predetermined stock threshold for the printer (e.g., the personal printer 26, the first-party 3D printer 29, and/or the third-party 3D printer 28).

The processor 34 may determine whether (decision block 108) the materials (e.g., one or more material types used for and/or suitable for printing the part) are available for delivery within or below a threshold time frame (e.g., two days). That is, the processor 34 may determine whether materials are available to restock the materials stocks falling below the threshold. The time frame may be based on one or more factors, such as the location of the insured property needing the part, severity of environmental conditions at the location in the area, likelihood of worsening environmental conditions, criticalness of the part to the insured property, and so forth. Unless the materials may be delivered within the time frame, the processor 34 may determine that the materials are unavailable for delivery. In some embodiments, the processor 34 may determine that the materials are unavailable for delivery if the cost for the materials is above a threshold cost (e.g., based on an average cost per unit) for the materials. That is, the materials may be available but may not be delivered in a timely manner within the time frame or may be cost inefficient. For example, if a tornado is expected to be at the delivery location in two days, such that the time frame is one day (e.g., one day for delivery to provide time for installation), and the materials for the part may not be delivered for three days, then the processor 34 may consider the materials showing available in inventory as unavailable. As another example, the materials may be located at a warehouse and delivery from the warehouse to the delivery location may not be within the time frame (e.g., 4 days).

If the materials are available for delivery and to efficiently provide printing materials to the consumer, the processor 34 may request delivery (process block 110) of the materials to the printer for 3D printing. To avoid extensive delivery times, the processor 34 may locate the materials that are within a threshold distance from the printer and have a delivery service via the delivery devices 36 to deliver the materials to the printer (e.g., via a drone). In some instances, an insured member may have printing material in stock and may provide the materials to the printer and/or consumer requesting the materials for printing the part. As such, delivering materials otherwise unavailable (e.g., out of stock, undeliverable within a threshold distance, undeliverable within a threshold time frame, and/or over a cost threshold) to the printer may supplement an existing supply of materials available to the printer.

As previously discussed, an application of the user device 24 may provide a recommendation for the particular part, as well as provide the recommendation for obtaining the materials (e.g., from another member or a third-party facility within the threshold distance). The application may also provide a recommendation and or automatically request the materials low in stock based on monitoring the printer (e.g., application and/or user device 24 linked to the printer). If the materials are not available for delivery, the processor 34 may request (process block 112) remote printing using a different printing source. For example, if the present printing of the part is via the personal 3D printer 26, the processor 34 may request printing at a near third-party 3D printer 28 or a first-party 3D printer 29 based on the quickest delivery option and/or cost efficiency.

Figure 5:
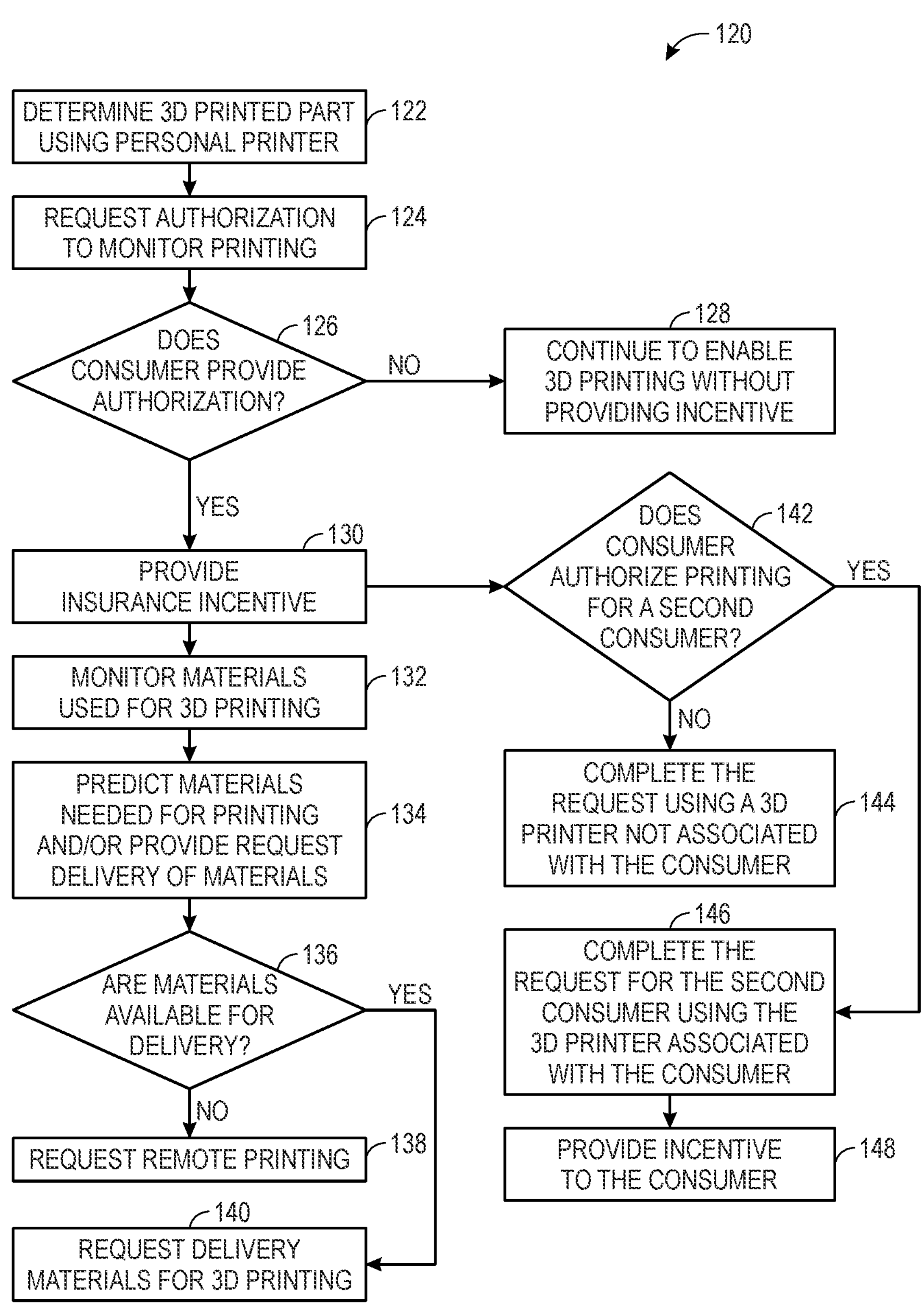
FIG. 5 is a flow diagram of a method for monitoring a personal printer, in accordance with embodiments described herein.
Figure 6:
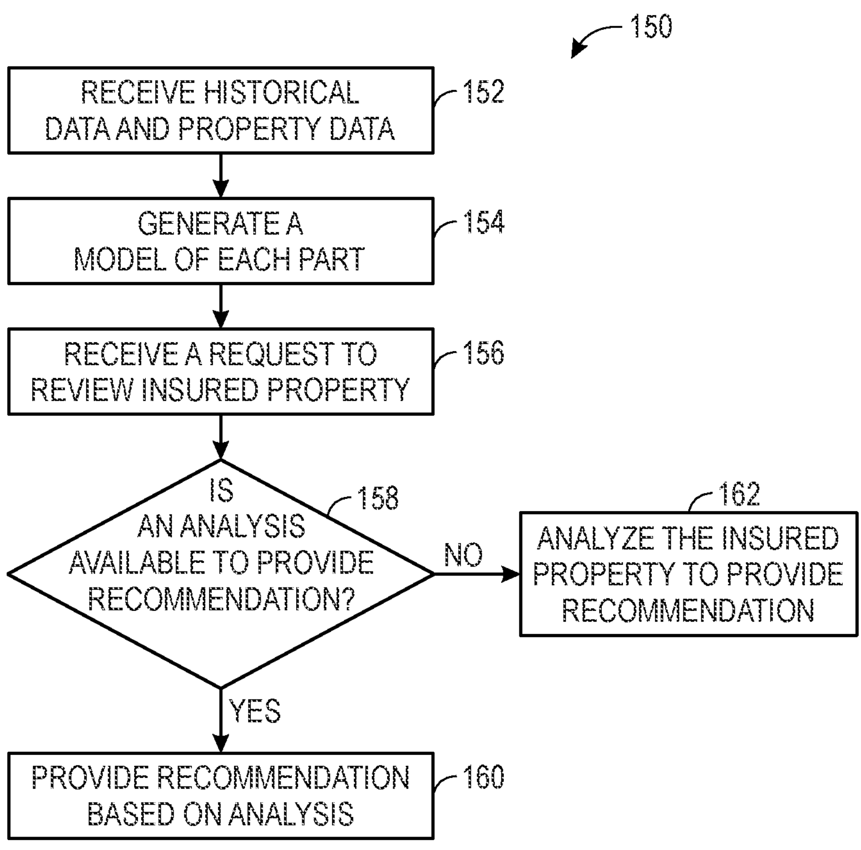
FIG. 6 is a flow diagram of a method for recommending a part type and materials for a 3D printed part, in accordance with embodiments described herein.

FIG. 5 is a flow diagram of a method 120 of the parts system 10 monitoring a personal 3D printer 26. The processor 34 may determine (block 122) that the consumer associated with a personal 3D printer 26 (e.g., owner of printer) has and/or will be printing a requested part using the personal 3D printer 26. The insurance company may benefit from monitoring the personal 3D printer 26 to ensure that the consumer prints the part using the recommended materials to maintain a parts quality standard. In this manner, parts with a quality below the threshold may not be used for the insured property to avoid unexpected operations otherwise often associated with parts not meeting the standard. Similarly, the insurance company may benefit from monitoring the printer to monitor the materials stock for printing (e.g., logged and tracked with the printer) to automatically deliver additional material if stock falls below a threshold, availability of the printer for additional print requests, and the like. As such, the processor 34 may request (process block 124) authorization to monitor the personal 3D printer 26. In particular, the processor 34 may provide the consumer with a notice of benefits for authorizing the processor 34 to monitor the printer. For example, the notice of benefits may include incentives provided by the insurance company.

As such, the processor 34 may determine whether (decision block 126) the consumer provides authorization. If the consumer does not provide authorization, the processor 34 may continue to enable (process block 128) printing via the personal 3D printer without providing the incentive. In some embodiments, although the consumer does not approve authorization to monitor the personal 3D printer 26, the consumer may authorize requests for printing parts for other members (e.g., via a member-to-member printing network) and/or providing printing materials to other members (e.g., via a member-to-member delivery network).

On the other hand, if the consumer does authorize the processor 34 to monitor the personal 3D printer, the processor 34 may provide (process block 130) the insurance incentives to the consumer. For example, the incentives may include a reduction in insurance premiums, subsidize the 3D printer, discount or credit towards other 3D printing tasks, and the like. Additionally or alternatively, the incentives may include a cash-back amount over a time period, a reduction in premiums for another service associated with the insurance company and used by the consumer (e.g., house insurance), reduced charge for printing materials, and the like.

The processor may monitor (process block 132) materials used for the 3D printing. That is, the processor may monitor the materials used for printing the part with respect to the recommended range of materials and/or substitute materials. The processor 34 may monitor the one or more materials in stock for a different printing material than the range of recommended materials when the recommended materials are in stock. As such, the processor 34 may notify the consumer to print using the recommended materials since they are in stock, monitor compliance with the notified recommendation, and adjust premiums based on the compliance. That is, the processor 34 may increase premiums in response to non-compliance and decrease premiums in response to compliance. Moreover, the processor 34 may provide an analysis of insurance coverage and how printing parts and/or using certain materials may positively impact (e.g., decrease premiums) or negatively impact (e.g., increase premiums) the insurance coverage.

From monitoring the personal 3D printer 26, the processor 34 may predict (process block 134) materials needed for printing, request delivery of the materials, or both. That is, and as previously mentioned, monitoring printing may facilitate the processor 34 determining present stock of materials and whether the materials stock is below or expected to fall below a predetermined materials stock threshold. In particular, the processor 34 may monitor print tasks in queue for the printer, parts that may be replaced based on environmental conditions around the insured property, print tasks often completed by the printer, print tasks for other members to be assigned to the printer, and so forth. As such, the processor 34 may use this monitoring data to forecast which materials may be below the respective materials stock threshold.

If the materials are presently or predicted to be below the stock threshold and as discussed with respect to FIG. 4, the processor 34 may determine whether (decision block 136) the materials are available for delivery (e.g., decision block 108 of FIG. 4), request delivery (process block 140) materials in response to the materials being available for 3D printing (e.g., process block 110 of FIG. 4), and request remote (process block 138) printing (e.g., process block 112 of FIG. 4).

As previously discussed, the parts system 10 may use a personal 3D printer associated with a consumer (e.g., insured member) to complete a request for printing a part for another consumer, facilitating member-to-member printing. Similarly, the parts system 10 may request delivery of materials from a consumer to another consumer, for example, based on materials stock being below a threshold stock, facilitating member-to-member delivery. That is, the parts system 10 may generally link or connect consumers (e.g., members) so that consumers owning personal 3D printers 26 may be paid for supplying other consumers with parts or parts-related items (e.g., materials). By way of example, the member-to-member printing may facilitate 3D prosthesis printing for wounded soldiers, such as customized crutches. A consumer may capture a picture of a foot (e.g., via the user device 24) of the soldier and print orthotics. The parts system 10 may provide credits for the consumer participating in the member-to-member printing by providing the personal 3D printer. The incentive may provide a personal benefit, for example, for future 3D printing benefits unrelated to the insurance company. Consumers may provide medical devices (e.g., pacemakers and the like) in a similar manner. Moreover, consumers may also provide 3D printed houses for veterans, homeless, and so forth. The 3D printed home may be less costly to provide than a constructed home (e.g., non-3D printed). In some embodiments, recycled material may be used for low-income housing.

As shown, the processor 34 may determine (decision block 142) whether the consumer authorizes printing for a second consumer. In some embodiments, the incentives previously discussed may be provided if the consumer authorizes printing for the second consumer. In some embodiments, the insurance company may provide personal 3D printers 26 to consumers and/or subsidize the personal 3D printer 26. By way of example, the insurance company may subsidize the printer if the consumer will authorize future requests to print for the second consumer (e.g., other consumers).

If the consumer does not authorize printing using the personal 3D printer 26 on behalf of a second consumer, the processor 34 may complete (process block 144) the request for the second consumer using a 3D printer not associated with the consumer. That is, the processor 34 may request printing using a first-party 3D printer 29 or a third-party 3D printer 28. On the other hand, if the consumer does authorize printing for the second consumer, the processor 34 may complete (process block 146) the request for the second consumer using the personal 3D printer. Moreover, the processor 34 may provide (process block 148) one or more previously discussed incentives to the consumer for participating in the member-to-member printing. The processor may provide similar incentives for the consumer participating in member-to-member materials delivery.

FIG. 6 is a flow diagram of a method 150 for recommending a part type and materials for a 3D printed part. In some embodiments, the method 150 may be performed by a recommendation system coupled to or integrated with the parts system 10. The processor 34 may receive (process block 152) historical data, property data, or both. In some instances, the historical data, property data, or both, may be used to as training data for machine learning. As such, machine learning may be used to determine the recommendations described herein. Generally, historical data may include data collected overtime by first-party databases, third-party databases, the components (e.g., of FIG. 1), and so forth, related to the parts and materials used for the parts. The historical data may also include data related to environmental conditions for a particular area over time. The historical data may also include parts often requested or replaced, types, model numbers, models (e.g., 3D printing instructions), materials for the parts, one or more uses of the part types, and the like. The property data may include diagrams of each model number (e.g., one or more versions)

of each part type of an insured property, as well as an indication of the model numbers historically associated with particular insured properties. By way of example, the processor 34 may store architectural diagrams of the insured property (e.g., taken during underwriting process) in the database 18. The diagrams may indicate parts used in the insured property.

Using the historical data, the property data, or both, the processor 34 may generate (process block 154) a model (e.g., 3D printing instructions) of each part that associated portions of insured property with particular part types. That is, the processor 34 may perform statistical analysis and the like to determine the most suitable part type and/or one or more materials for printing the part for a particular area, for a particular insured property, or both, and store the results of this analysis to use for providing recommendations. The processor 34 may also determine and store an indication of part types associated with the insured property (e.g., textual data and diagrams). In this manner, the processor 34 may recommend using a particular part made of particular printing materials based on a history and/or insured property data.

The processor 34 may receive (process block 156) a request to review an insured property. In particular, the request may include a description, an image, a video, a part ID number (e.g., model number), and the like. The request may also provide an indication of the location of the insured property, data related to the consumer requesting the recommendation, and similar information. In some embodiments, the request may include a series of questions and the processor 34 may answer questions based on the models of each part and/or machine learning. The processor 34 may determine whether any parts on the insured property may be replaced. The processor 34 may make this determination as described above, including comparing received data to information in a template. If the processor 34 determines there are parts that may be replaced, the processor 34 may determine whether (decision block 158) an analysis is available for providing a recommendation regarding any replacement parts. That is, the processor 34 may review the various analyses that indicate the most suitable part type, model of the part type, and materials of the part type, for the requested part to be replaced and/or based on the insured property. In some instances, an analysis may not exist or include enough data to provide the recommendation, for example, based on a lack of historical data, property data, or both (e.g., lack of training data for machine learning).

If there is an analysis, the processor 34 may provide (process block 160) the recommendation regarding the replacement part based on the analysis. That is, the processor 34 may perform a textual analysis, image analysis, and the like, on the request to look up a part type and provide the corresponding recommendation of the part type and recommended materials. On the other hand, if there is not an analysis already available, then the processor 34 may analyze (process block 162) the insured property in the request to provide the recommendation. That is, the processor 34 may analyze image data (e.g., a picture and/or video) of the part in the request to be replaced and suggest the most suitable part type and materials based on the analysis and using machine learning. For example, the parts system 10 may learn, via various data sets, the likelihood of a part to be recommend and/or material to be used for the portion of the insured property with the part. That is, the parts system 10 may provide the recommendation based on historical data related to the part type or a similar part type, diagram of the part type or a similar part type (e.g., earlier version of the model), materials used for the part type or similar part type, and the like, for the particular property type. The parts system 10 may also consider the particular area, diagram or data of the property type (e.g., model identification), and so forth.

Using the systems and methods described herein, a part (e.g., replacement part) may be printed using a network of 3D printers for efficiently providing the part to a consumer. Moreover, the systems and methods described herein provide automatically requesting delivery of materials for printing the part based on one or more factors. That is, factors may be monitored to trigger a request to automatically request delivery of materials.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A parts system, comprising:

a network connecting 3D printers, the network comprising connections with a personal 3D printer, a first-party 3D printer, a third-party 3D printer, or any combination thereof, wherein the 3D printers in the network are each configured to print a part for a consumer; and a controller configured to:

receive a request to print the part;

provide a recommendation to print the part based at least in part on historical data of the part;

provide a recommendation to select a 3D printer from the 3D printers in the network, as a selected 3D printer of the network based at least in part on a stock of a material for printing the part;

initiate printing the part via the selected 3D printer of the network, wherein the part is printed via the selected 3D printer based on the initiation; and monitor the network to quantify an amount of utilization of the network by a consumer during the printing of the part, and define an insurance adjustment for the consumer based on the amount of utilization of the network by the consumer, wherein the insurance adjustment reflects technical risk associated with the utilization of the network by the consumer.

2. The parts system of claim 1, wherein the controller is configured to automatically request delivery of the material to the selected 3D printer of the network in response to a determination that the stock of the material at the selected 3D printer of the network is below a predetermined threshold.

3. The parts system of claim 1, comprising an unmanned aerial vehicle, wherein the unmanned aerial vehicle is configured to deliver the material to a location associated with the selected 3D printer of the network.

4. The parts system of claim 1, wherein the selected 3D printer of the network is selected based at least in part on a cost-benefit analysis of the 3D printers connected by the network.

5. The parts system of claim 1, wherein the controller is configured to provide the recommendation to select the 3D printer from the 3D printers in the network using a member-to-member printing network.

6. The parts system of claim 1, wherein the controller is configured to recommend delivery of the material to the selected 3D printer of the network using a member-to-member delivery network.

7. The parts system of claim 1, wherein the material comprises metal, plastic, clay, concrete, wood, or any combination thereof.

8. The parts system of claim 1, wherein the third-party 3D printer comprises a 3D printer associated with at least a direct repair provider, an original equipment manufacturer, or both.

9. The parts system of claim 1, wherein information regarding the stock of a material associated with the third-party 3D printer is distributed in a block chain.

10. The parts system of claim 1, wherein the controller is configured to search a database containing historical data related to environmental conditions for an area in which the selected 3D printer of the network is located.

11. The parts system of claim 1, wherein:

the request comprises an input from the consumer; and the controller is configured to define the insurance adjustment for the consumer based on the material for printing the part.

12. The parts system of claim 1, wherein the controller is configured to:

recommend a recommended material for printing the part;

in response to a determination that the consumer selects the recommended material, maintain or reduce an insurance premium for the consumer; and in response to a determination that the consumer does not select the recommended material, increase the insurance premium for the consumer.

13. The parts system of claim 1, wherein the controller is configured to:

request authorization from the consumer to monitor the selected 3D printer, wherein the selected 3D printer is associated with the consumer; and in response to receiving authorization to monitor the selected 3D printer, provide an incentive to the consumer, wherein the incentive comprises one or more of a reduction in an insurance premium associated with the consumer, subsidization of the selected 3D printer, and a discount associated with printing on the selected 3D printer.

* * * * *